United States Patent
Cioffi-Revilla (10) Patent No.: US 7,650,258 B2
(45) Date of Patent: Jan. 19, 2010

(54) ANTHROPOGENIC EVENT RISK ASSESSMENT

(75) Inventor: Claudio Cioffi-Revilla, Washington, DC (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 0 days.

(21) Appl. No.: 11/934,464

(22) Filed: Nov. 2, 2007

(65) Prior Publication Data

US 2008/0120063 A1 May 22, 2008

Related U.S. Application Data

(60) Provisional application No. 60/864,057, filed on Nov. 2, 2006.

(51) Int. Cl.
*G06F 19/00* (2006.01)

(52) U.S. Cl. ............... 702/181; 702/2; 702/183; 700/91; 700/93; 704/240

(58) Field of Classification Search ............ 702/2, 702/181–183; 700/91, 93; 705/11; 60/274; 704/240

See application file for complete search history.

(56) References Cited

U.S. PATENT DOCUMENTS

2005/0004833 A1* 1/2005 McRae et al. ............... 705/11
2006/0229813 A1* 10/2006 Tobiska ..................... 702/2

OTHER PUBLICATIONS

Saphier et al., 'Forecasting models to quantify three anthropogenic stresses on coral reefs from marine recreation: Anchor damage, diver contact and copper emission from antifouling paint', 2005, Scinece Direct, pp. 590-598.*

* cited by examiner

*Primary Examiner*—Edward Raymond
*Assistant Examiner*—Elias Desta
(74) *Attorney, Agent, or Firm*—David G. Grossman (57) ABSTRACT

A computer implemented method and system for assessing the risk of an anthropogenic event are disclosed. An anthropogenic event is defined and recursively decomposed into causal conditions with ascertainable probabilities. The causal conditions and probabilities are transformed into a comprehensive probability of the event. The risk related to the occurrence of the event, such as a monetary loss, is computed based on its derived probability.

21 Claims, 7 Drawing Sheets

ANTHROPOGENIC EVENT RISK ASSESSMENT

CROSS-REFERENCE TO RELATED APPLICATIONS

This application claims the benefit of U.S. Provisional Application No. 60/864,057, filed Nov. 2, 2006, entitled "A Process for Assessing Risk of Anthropogenic Catastrophes," which is hereby incorporated by reference in its entirety.

BRIEF DESCRIPTION OF THE SEVERAL VIEWS OF THE DRAWINGS

The following drawings describe some embodiments of the present invention.

DETAILED DESCRIPTION OF EMBODIMENTS

Embodiments of the invention relate to a risk assessment system and method. The embodiments disclose computer implemented methods and systems to analyze risk related to anthropogenic events. Anthropogenic events are events caused at least in part by man-made (non natural) conditions. They may include terrorist attacks, the use of weapons of mass destruction, other events carried out by humans as well as man-made events which combine with physical events, such as global warming or avalanches induced by human activities. Risk associated with an event may include a monetary or property loss related to its occurrence, such as estimates used for insurance or governmental purposes.

The term "component" is used herein to represent hardware, software or any combination thereof. Components described herein can be implemented on standard computers or can be implemented as specialized devices, such as field-programmable gate arrays (FPGAs), embedded processor systems, programmable logic devices (PLDs) or an application-specific integrated circuit (ASIC).

The term "error margin" is used herein to refer to a measurement of accuracy of a statistic. An error margin described herein can refer to an estimation of confidence in a sampling result or computed probability.

The term "estimated loss" is used herein to refer a value associated with the occurrence of an event. An estimated loss referred to herein can be represented by a positive or negative numerical value, such as a monetary value, a population value, or a number of assets.

Figure 1:
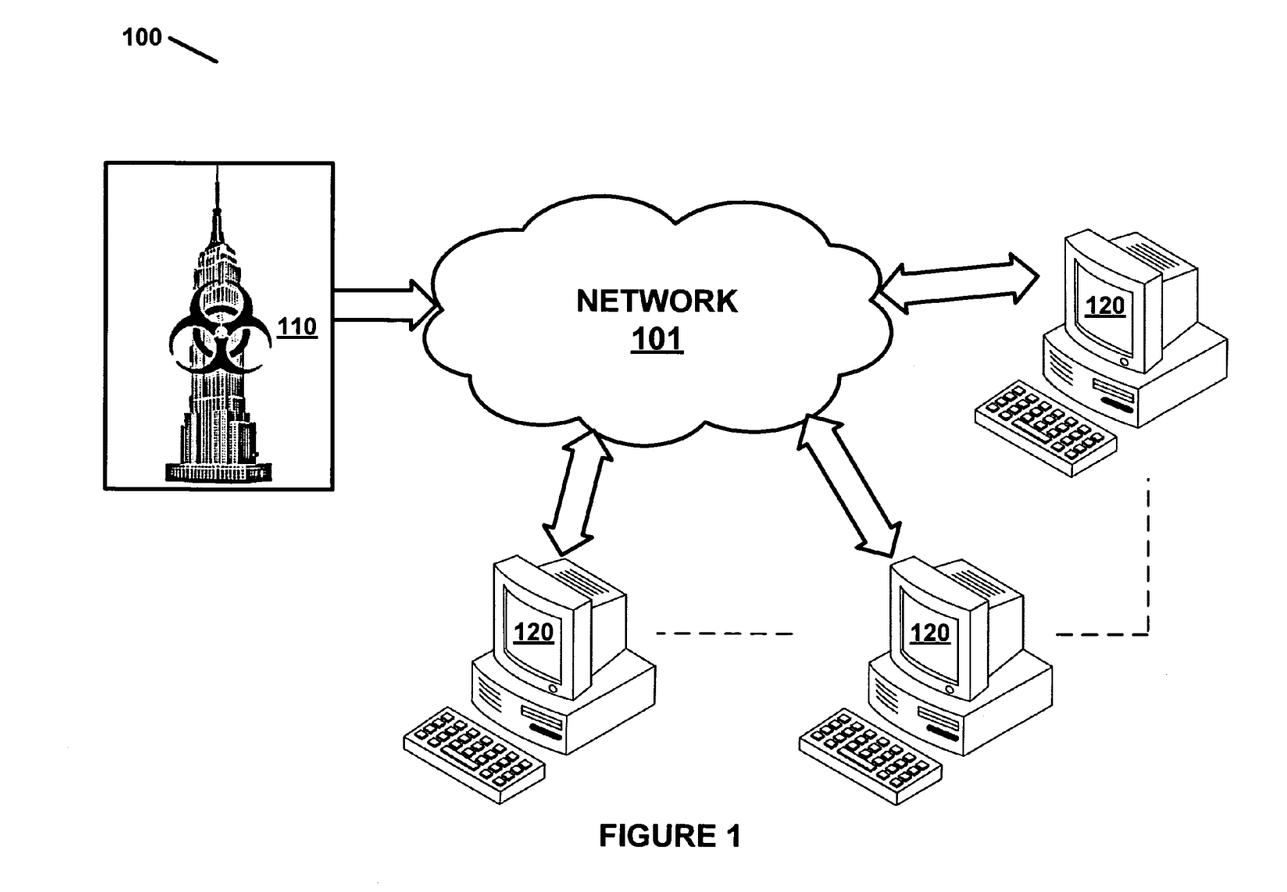
FIG. 1 is an overview of an anthropogenic event risk assessment system, according to one embodiment of the present invention.

An overview of an embodiment of an anthropogenic event risk assessment system is shown in FIG. 1. An anthropogenic event 110, for which a risk analysis is desired, can be transformed by a computer implemented anthropogenic event risk assessment system 120 over a hardware network 101 into an ascertainable risk value associated with the occurrence of the anthropogenic event 110 by interested parties. For example, the anthropogenic event 110 depicted in FIG. 1 is a biological terrorist attack in Manhattan. An interested party wishing to determine the risk of the event, such as an insurance analyst, building owner or government agency, utilizes the computer implemented anthropogenic event risk assessment system 120 to ascertain the risk value, having a known degree of precision and which can be used to assess physical monetary considerations.

For example, an interested party may be an insurance agent who may use a computer implemented anthropogenic event risk assessment system 120 in determining whether to adjust insurance policies or premiums on a building or region. A governmental agency may be another interested party, wanting to determine the risk of an anthropogenic event in a certain region as a measure in determining budgetary outlays, such as where to focus homeland security resources. A building owner or real estate developer may be another interested party who may use a computer implemented anthropogenic event risk assessment system 120 to analyze particular investment opportunities, such as risk related to investing in ownership of a particular building. Other interested parties may have other financial considerations to be considered in conjunction with a computer implemented anthropogenic event risk assessment system 120.

Figure 2:
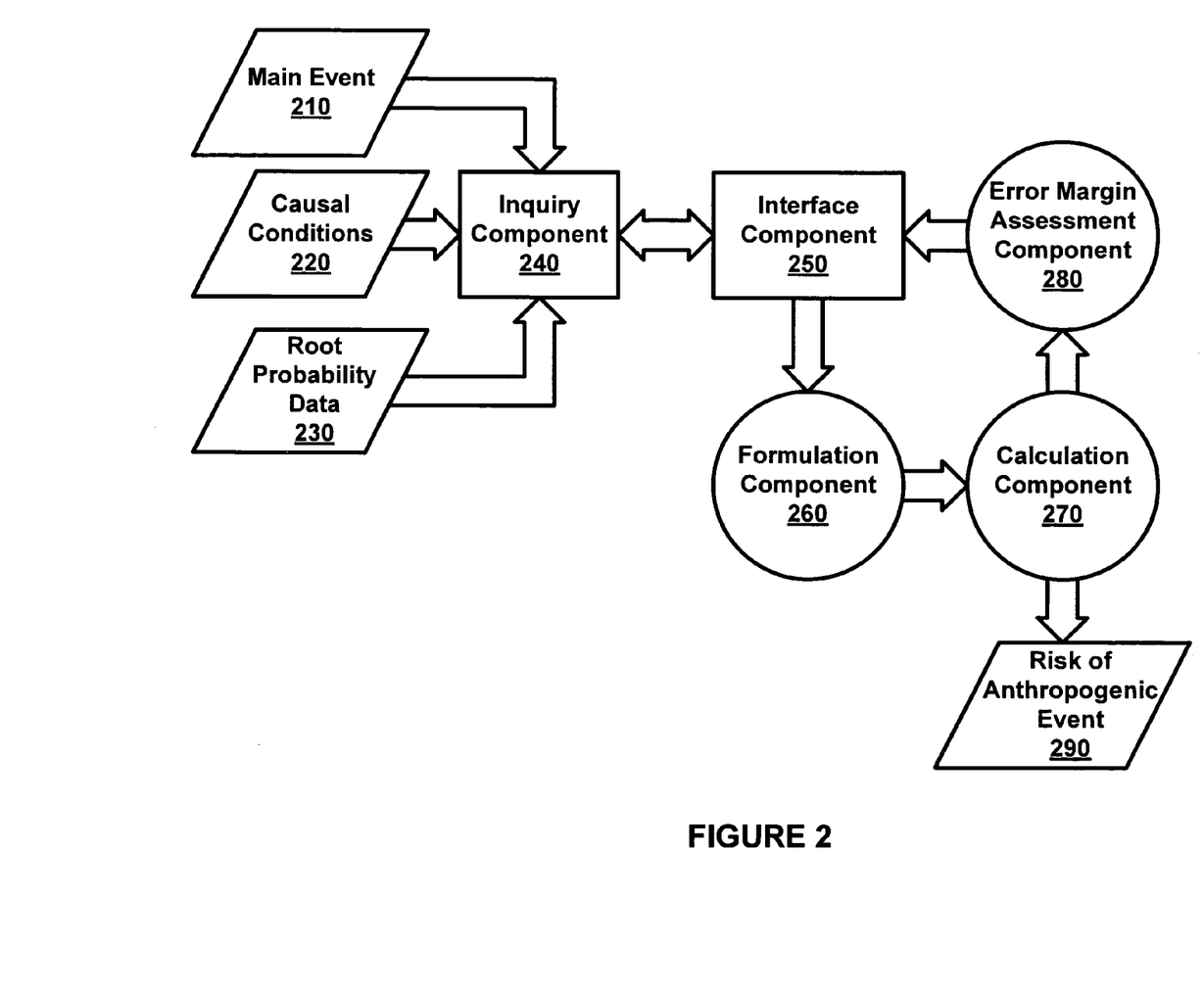
FIG. 2 is a system diagram of an anthropogenic event risk assessment system, according to one embodiment of the present invention.
Figure 3:
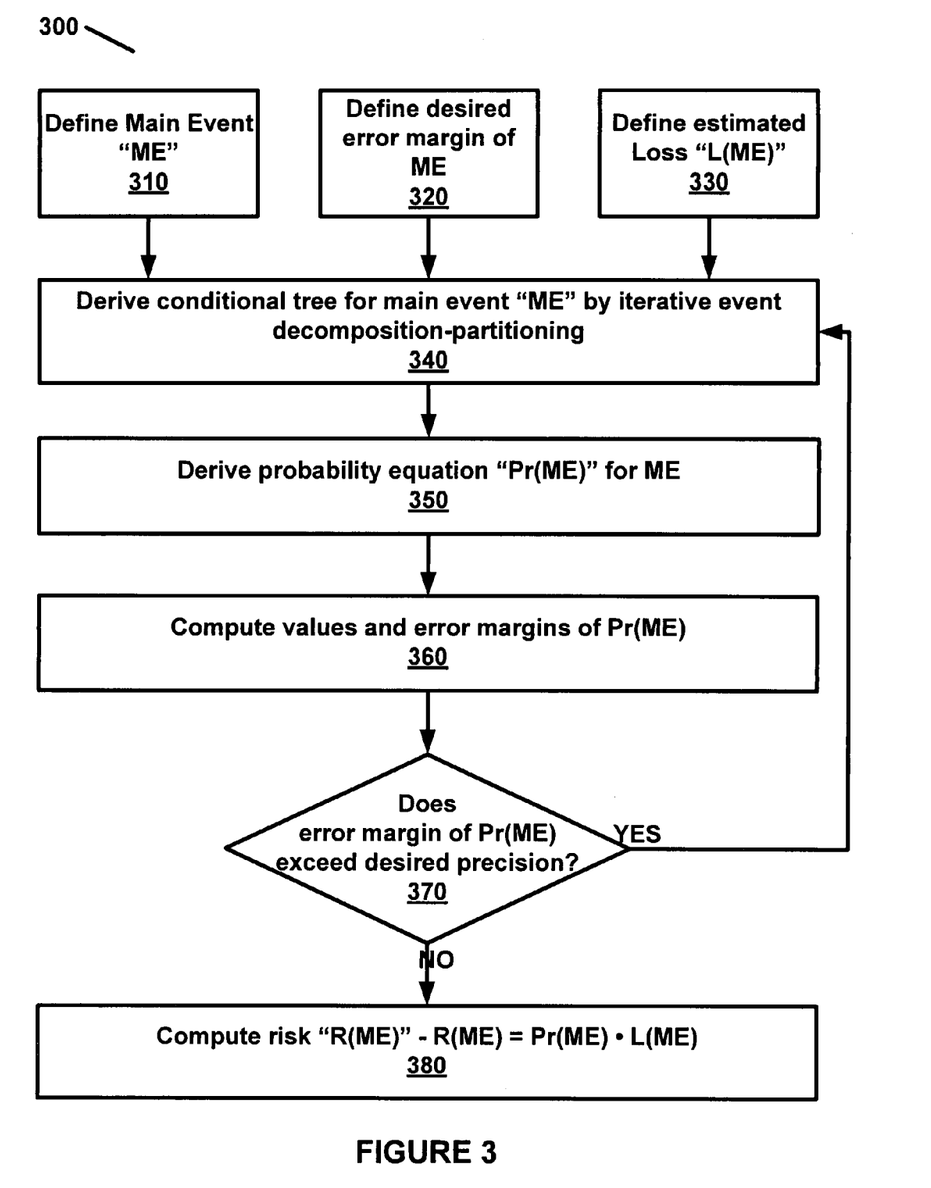
FIG. 3 is a flow diagram depicting an anthropogenic event risk assessment method, according to one embodiment of the present invention.
Figure 4:
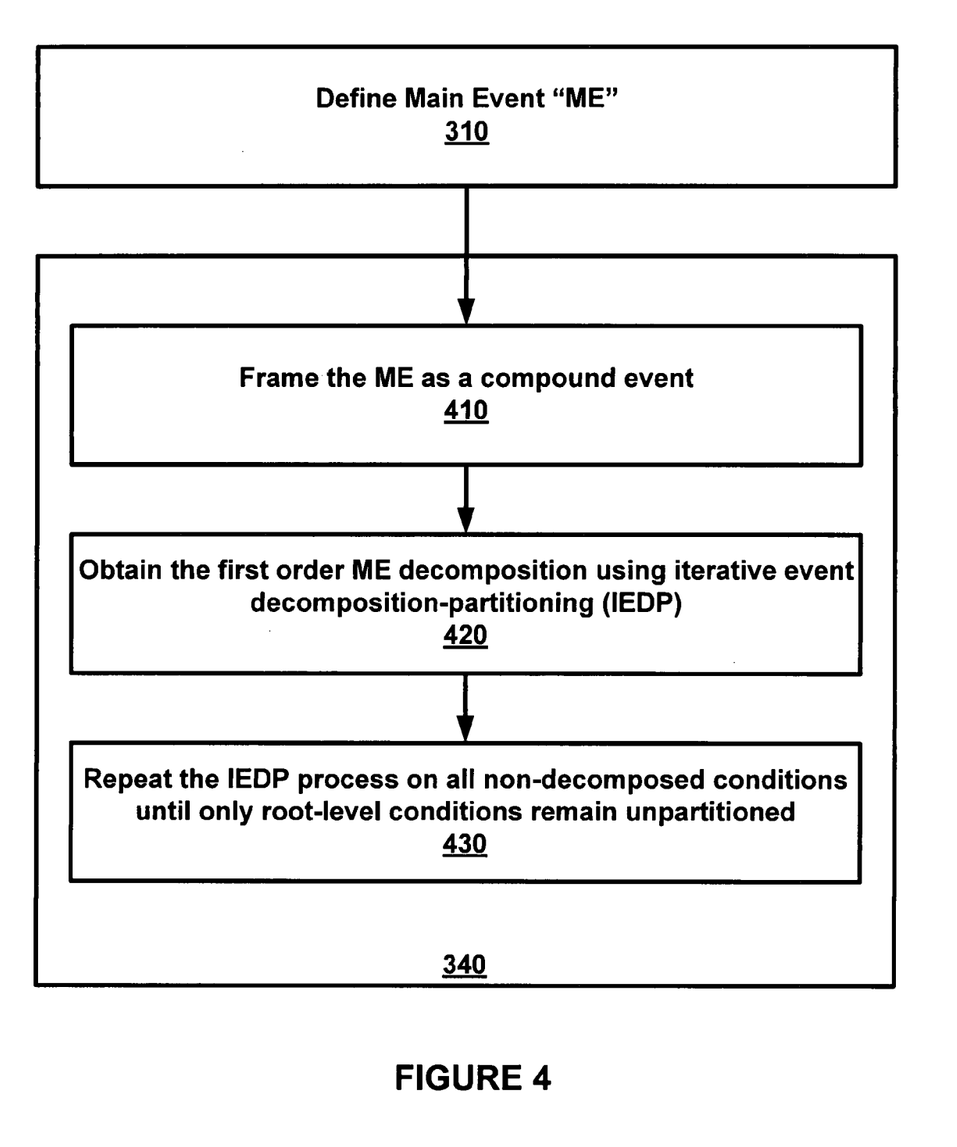
FIG. 4 is a flow diagram depicting decomposition of an anthropogenic event in an anthropogenic event risk assessment method, according to one embodiment of the present invention.
Figure 5:
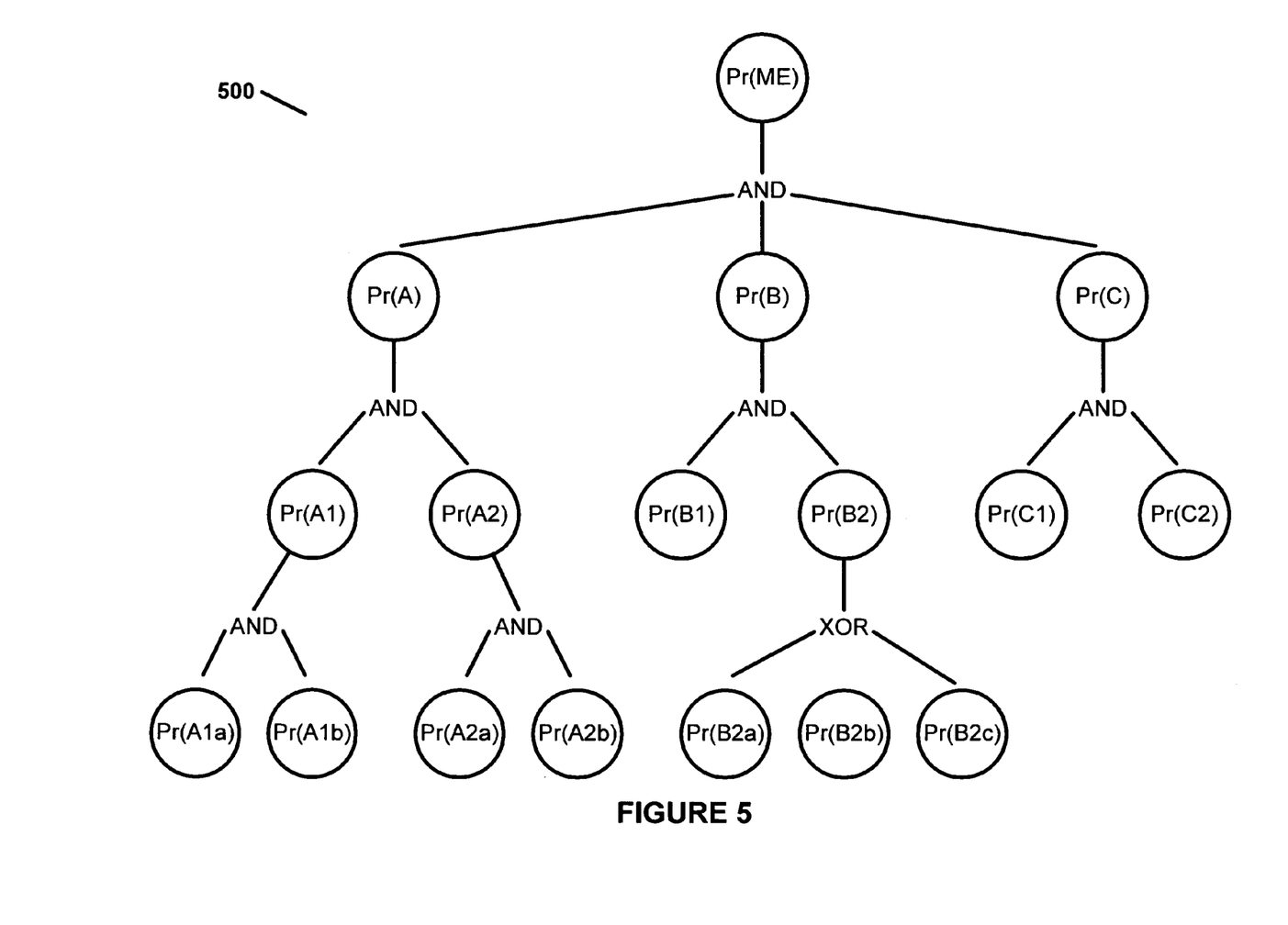
FIG. 5 is an example graphical event tree including condition relationships derived through anthropogenic event risk assessment, according to one embodiment of the present invention.
Figure 6:
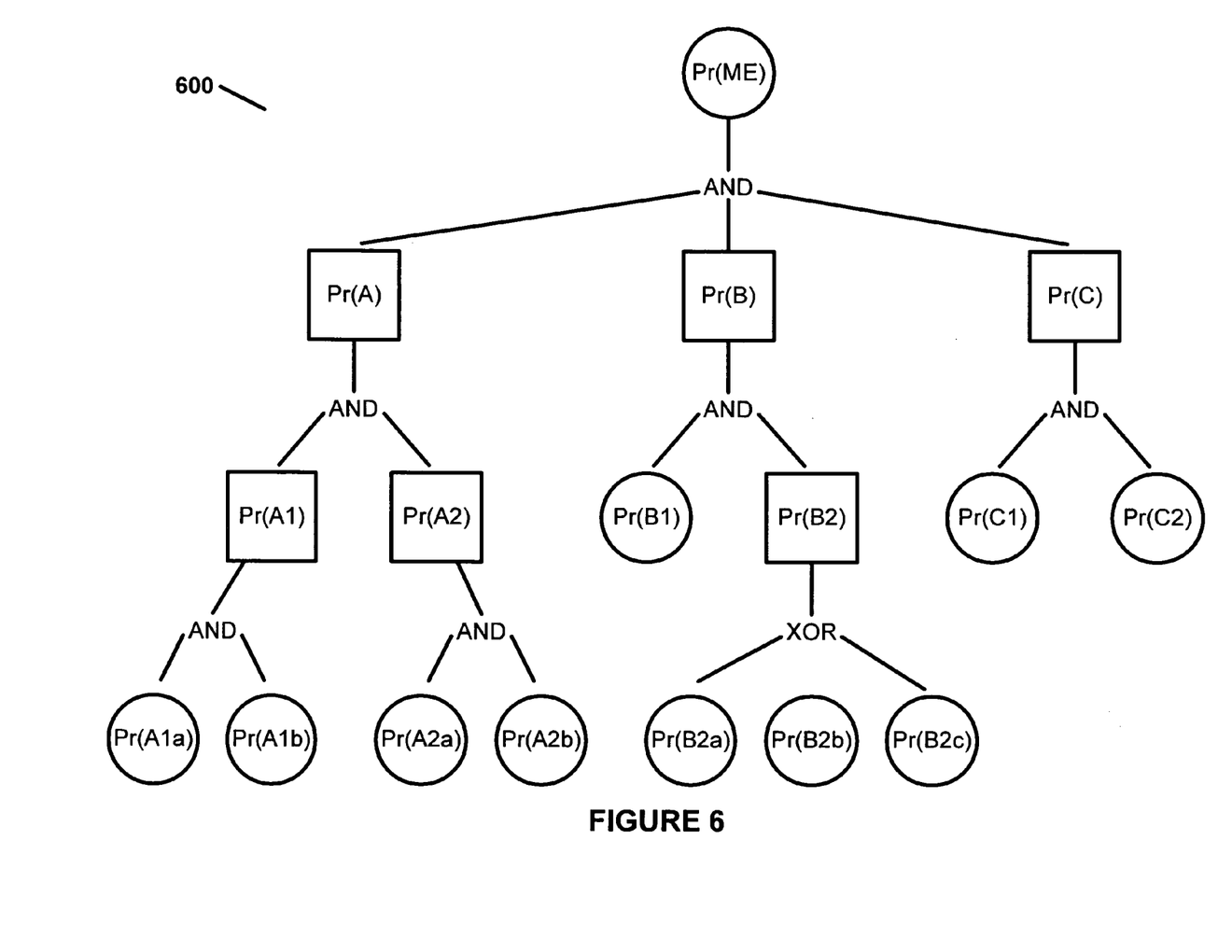
FIG. 6 is an example graphical event tree including condition relationships and root level conditions derived through anthropogenic event risk assessment, according to one embodiment of the present invention.
Figure 7:
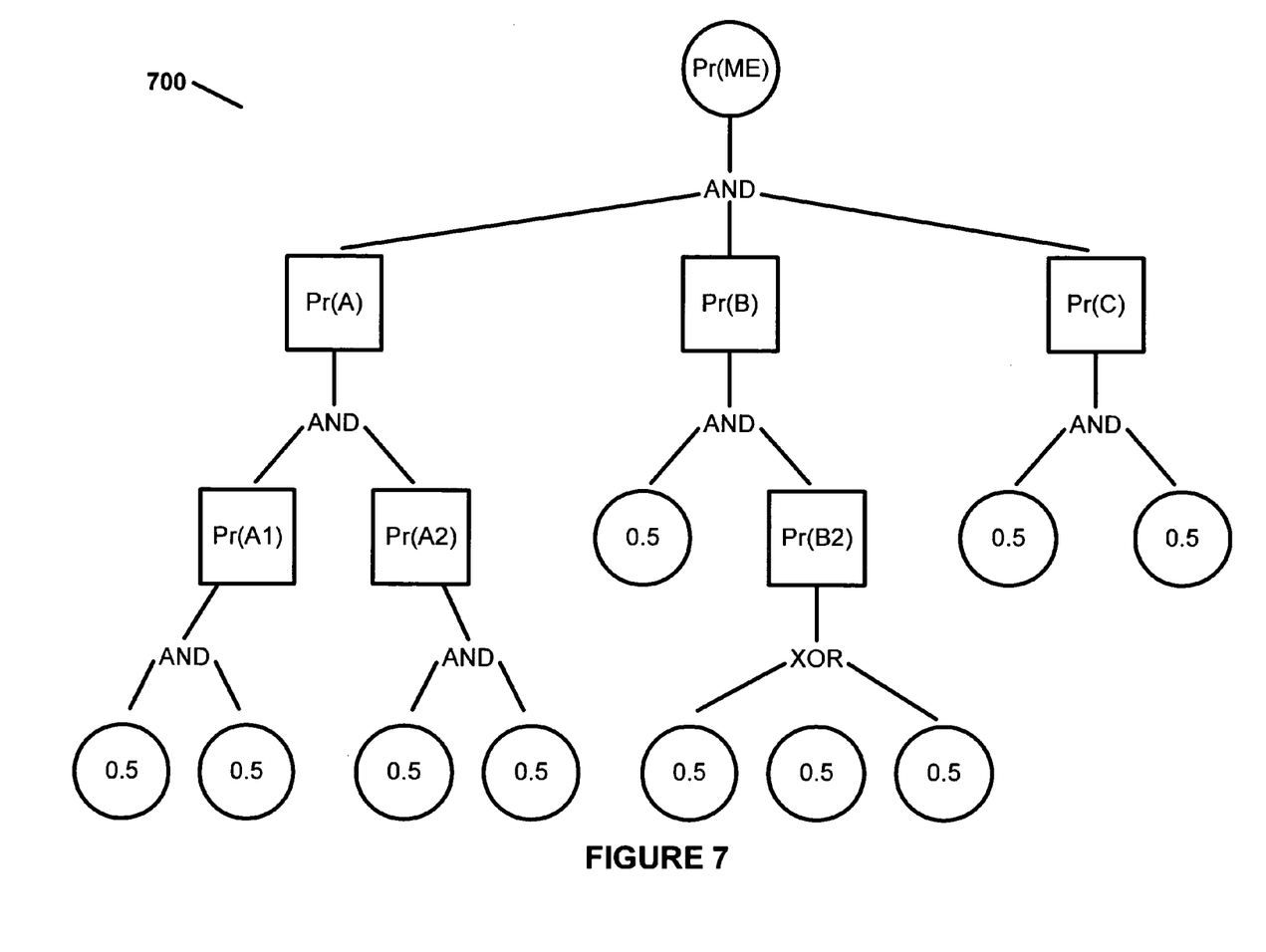
FIG. 7 is an example graphical event tree which includes condition relationships and probability values derived through anthropogenic event risk assessment, according to one embodiment of the present invention.

A system diagram of an embodiment of a computer implemented anthropogenic event risk assessment system 120 is depicted in FIG. 2. The embodiment depicted in FIG. 2 performs some or all of the actions of an anthropogenic event risk assessment method, which is depicted in FIGS. 3 and 4.

An interface component 250 may be configured to receive information related to an anthropogenic event, such as the subject of the main event 210, causal conditions 220 related to the main event and root probability data 230. Information can be communicated into the interface component 250 by a client through an inquiry component 240 of the interface.

The inquiry component 240 may be configured to request causal conditions 220 for the main event 210 based on a process of decomposition partitioning. Through this process, each causal condition of the main event 210 can be decomposed into lower order causal conditions (at 340 of FIG. 3, discussed below). The main event 210 may be framed as a compound event (at 410 of FIG. 4, discussed below). For example, if a main event is defined as "a biological terrorist attack in Manhattan" then it can be framed as a compound event, such as "what would it take for a biological terrorist attack in Manhattan to succeed" or "how does a biological terrorist attack in Manhattan take place."

The decomposition partitioning process can be performed by obtaining the first order decomposition (at 420) and recursively decomposing each resultant causal condition (at 430) until finite probability values for such causal conditions may be within the domain of ascertainable root probability data 230.

Causal conditions 220 of a main event 210 may be associated by conjunctive (AND) or disjunctive (OR) relationships.

Additionally, a conjunctive relationship may be sequential (SAND) and a disjunctive relationship may be exclusive (XOR). Such relationships of the causal conditions 220 may be transmitted through the inquiry component 240. The relationships and causal conditions may be transmitted or verified through the inquiry component 240 through a graphical event tree.

The interface component 250 may be configured to communicate the causal conditions 220, including their various relationships, to a formulation component 260. The formulation component 260 derives a probability equation representing the causal conditions 220 through the application of probability modeling (at 350).

For example, the probability of an event or condition which is decomposed into conjunctive causal conditions may be represented by the product of the probability of those causal conditions: $Pr(A)=Pr(B_1) \cdot Pr(B_2) \cdot \ldots \cdot Pr(B_n)$. In this example, $Pr(A)$ is the probability of the main event or condition, and $Pr(B_1)$ through $Pr(B_n)$ represent probabilities for causal conditions for A which are related by conjunction.

Also by example, a disjunctive relationship of causal conditions may be represented by $Pr(A)=1-[1-Pr(B_1)] \cdot [1-Pr(B_2)] \cdot \ldots \cdot [1-Pr(B_n)]$. A sequential conjunctive relationship of causal conditions may also be represented in the same way, although each causal event will be conditional on the preceding event. An exclusive disjunctive relationship can be expressed as a summation ("$\Sigma$") of the probabilities of causal events $Pr(B_1) \ldots Pr(B_n)$. Such formulas are examples of probability rules which may be applied by the formulation component 260. Other probability rules may be applied instead of and/or in addition to these examples.

A calculation component 270 applies the root probability data 230 to the probability formula for the main event 210 derived by the formulation component 260. The calculation component 270 computes an overall probability for the main event 210, and may additionally compute an error margin for the probability result (at 360).

There may be an error margin assessment component 280, which determines lower and upper boundaries that may be compared with a range specified by the client as desirable (at 370). If the error margin is outside of a desirable range the error margin assessment component 280 communicates a message to the interface component 250 (at 370). Upon receiving such a message, the interface component 250 can request the formulation component 260 to decompose with higher precision the causal conditions 120.

When the calculation component 270 has ascertained a probability for the main event 210, a further calculation for the overall risk 290 of the anthropogenic event may be determined by multiplying the probability by a value associated with the occurrence of the main event, such as a loss estimate (at 380). The risk 290 may be communicated to the client by the interface component 250.

A flow diagram of an embodiment of a computer implemented anthropogenic event risk assessment method is depicted in FIG. 3. FIG. 4 depicts the decomposing of an anthropogenic event in an anthropogenic event risk assessment method, according to one embodiment of the invention.

In FIG. 3, a main event may be defined at 310. As above, an example main event may be defined as "a biological attack on Manhattan." A desired error margin can be defined at 320. The desired error margin can be applied by the method of this embodiment to regulate the precision of the method, described below. An estimated loss can be defined at 330. The estimated loss forms part of the basis of the risk result of the method.

A conditional tree is derived at 340. FIG. 4 depicts the construction of the conditional tree at 340, according to an embodiment of the method of the invention. To produce the conditional tree, the main event defined at 310 can be further defined as a compound statement at 410. An example of a compound statement is "what would it take for a biological attack on Manhattan to succeed?"

A first order decomposition of the main anthropogenic event can be obtained at 420 by utilizing a process of iterative event decomposition partitioning (IEDP) to decompose the main event into causal conditions. For example, a biological attack on Manhattan may be decomposed into two first order causal conditions—(A) acquiring a biological weapon, (B) transporting the biological weapon to Manhattan, and (C) detonating the biological weapon. Other first order conditions may include the decision to mount an attack and other social and behavioral events.

The IEDP process can be recursively applied at 430 to non-decomposed conditions of the main event until the conditional tree terminates with root-level conditions, having ascertainable probabilities. In the example, conditions A, B, and C are not decomposed and do not have ascertainable probabilities, so they are decomposed by further inquiry into lower level causal conditions. Causal condition A—acquiring a biological weapon—requires (A1) obtaining a biological agent and (A2) converting the biological agent into a weaponized form. Condition B—transporting the weapon to Manhattan—involves (B1) obtaining a means of transportation and either (B2) obtaining false transportation credentials or (B3) co-opting a customs agent. Condition C—detonating the biological weapon involves (C1) attaching a detonating device to the weapon and (C2) initiating the detonation sequence.

At this point, some causal conditions may have ascertainable probabilities, for example conditions B1, C1 and C2 may have known probabilities and no further decomposition may be required. Conditions A1, A2, B2 and B3 may not have known probabilities and require further decomposition partitioning. Condition A1—obtaining a biological agent may involve (A1a) acquiring a means to store a biological agent and (A1b) stealing a biological agent from a medical laboratory. Condition A2—converting the biological agent into a weaponized form may involve (A2a) aerosolizing the agent and (A2b) obtaining a delivery means for the aerosolized agent. Condition B2—obtaining false transportation credentials may involve—(B2a) stealing credentials or (B2b) forging credentials. Finally, condition B3—co-opting a customs agent requires (B3a) scouting susceptible customs agents and either (B3b) acquiring a means of inducement (cash) or (B3c) acquiring a means of coercion (kidnapping a family member). At this point, the causal conditions in the example are ascertainable, and the IEDP decomposition process has produced a complete conditional tree at 340.

A probability equation can be derived at 350 from the conditional tree. The relationships between causal conditions may be represented by operators in order to form a mathematical model for the event tree. For example, the probability of an event or condition which is decomposed into conjunctive (AND) causal conditions may be represented by the product of the probability of those causal conditions: $Pr(A)=Pr(B_1) \cdot Pr(B_2) \cdot \ldots \cdot Pr(B_n)$. In this example, $Pr(A)$ is the probability of the main event or condition, and $Pr(B_1)$ through $Pr(B_n)$ represent probabilities for causal conditions for A which are related by conjunction.

A disjunctive (OR) relationship of causal conditions may be represented by $Pr(A)=1-[1-Pr(B_1)] \cdot [1-Pr(B_2)] \cdot \ldots \cdot [1-Pr(B_n)]$. A sequential conjunctive (SAND) relationship of causal conditions may also be represented in the same way, although each causal event will be conditional on the preceding event. An exclusive disjunction (XOR) relationship can be expressed as a summation ("$\Sigma$") of the probabilities of causal events $Pr(B_1) \ldots Pr(B_n)$.

Using the conditional tree resulting from the above example, causal conditions (A) acquiring a biological weapon, (B) transporting the biological weapon to Manhattan, and (C) detonating the biological weapon all have a conjunctive relationship and can be represented as $Pr(ME)= Pr(A) \cdot Pr(B) \cdot Pr(C)$. Condition A is constructed of conditions (A1) obtaining a biological agent and (A2) converting the biological agent into a weaponized form. These conditions have a conjunctive relationship and can be represented as $Pr(A)=Pr(A1) \cdot Pr(A2)$.

Condition B is composed of both a conjunctive relationship and a disjunctive relationship (B1) obtaining a means of transportation and either (B2) obtaining false transportation credentials or (B3) co-opting a customs agent, which is a exclusive disjunction (XOR) relation. These relationships may be formalized as $Pr(B)=Pr(B1) \cdot [Pr(B2)+Pr(B3)]$. This example formulation characterizes both the conjunction and the exclusive disjunction of the causal conditions. Condition C is composed only of conjunctive conditions—(C1) attaching a detonating device to the weapon and (C2) initiating the detonation sequence. The probability of these conditions may be represented as $Pr(C)=Pr(C1) \cdot PR(C2)$.

Continuing through the example tree, condition A1 comprises conjunctive conditions (A1a) and (A1b) and may be represented as $Pr(A1)=Pr(A1a) \cdot PR(A1b)$. Condition A2—is composed of (A2a) and (A2b) and may be represented as $Pr(A2)=Pr(A2a) \cdot PR(A2b)$. Condition B2—obtaining false transportation credentials comprises only a disjunctive relationship—either (B2a) stealing credentials or (B2b) forging credentials and may be represented as $Pr(B2)=Pr(B2a)+Pr(B2b)$. Finally, condition B3—co-opting a customs agent includes both a conjunctive and disjunctive relationship—(B3a) scouting susceptible customs agents and either (B3b) acquiring a means of inducement (cash) or (B3c) acquiring a means of coercion (kidnapping a family member). The probability of condition B3 may therefore be represented as $Pr(B3)=Pr(B3a) \cdot [Pr(B3b)+Pr(B3c)]$.

The formulations of the causal conditions would be represented as:

$$Pr(ME)=Pr(A) \cdot Pr(B) \cdot Pr(C). \text{ Where:}$$

$$Pr(A)=Pr(A1a) \cdot Pr(A1b)) \cdot (Pr(A2a) \cdot Pr(A2b))$$

$$Pr(B)=Pr(B1) \cdot [Pr(B2a)+Pr(B2b)+[Pr(B3a) \cdot (Pr(B3b)+Pr(B3c)]]$$

$$PR(C)=Pr(C1) \cdot PR(C2)$$

The probability equation for the entire conditional tree would therefore appear as: $Pr(ME)=(Pr(A1a) \cdot Pr(A1b)) \cdot (Pr(A2a) \cdot Pr(A2b))) \cdot (Pr(B1) \cdot [Pr(B2a)+Pr(B2b)+[Pr(B3a) \cdot (Pr(B3b)+Pr(B3c)]] \cdot Pr(C1) \cdot PR(C2))$.

A probability value for the main event and error margin can be determined at 360 by populating the root level probabilities of the probability equation with their known statistical probabilities or estimates thereof and performing the equation. For example, if the known probable success of A1a (acquiring a means to store a biological agent) is 50% and the probability of A1b (stealing a biological agent from a medical laboratory) is 3% then the probability formula may be populated with those values and performed: Pr(A1)=(A1a)·(A1b)=0.5·0.03=0.015. The probability values of each root level condition may be populated in such a manner and the entire operation is performed in similar manner, resulting in a probability value of the main event determined from the entire conditional tree. As an example, if all the root probabilities are estimated at 50%, or even odds, then the over probability is: Pr(ME)=Pr(A1a)·Pr(A1b)·Pr(A2a)·Pr(A2b)·[Pr(B1)·[Pr(B2a)+Pr(B2b)+[Pr(B3a)·[Pr(B3b)+Pr(B3c)]]]·Pr(C1)·Pr(C2)=0.5·0.5·0.5·0.5·[0.5·[0.5+0.5+[0.5·[0.5+0.5]]]·0.5·0.5=0.011718750≈1%.

An error margin may be determined at 360 for the probability calculation by factoring error margin values associated with the root level probabilities. The error margin may be compared to the desired error margin. In the previous example, the calculation can be iterated with, say, 3.5% as a lower bound and 6.0% as an upper bound, to computer the range around the 1% result based on the 5% estimate for root probabilities.

The risk of the main event can be determined at 380 based on the probability result determined at 360 and the estimated loss defined at 330. This may be done by multiplying the probability by the estimated loss to attain a numeric risk associated with the main event.

FIG. 5 depicts a conditional tree which may be derived through anthropogenic event risk assessment, according to an embodiment of the present invention. The depicted conditional tree 500 has four orders of conditions and indicates various types of causal relationships which may be expressed in the probability equation, such as conjunction (AND), disjunction (OR), sequential conjunction (SAND) and exclusive disjunction (XOR). The probability of the main event, in this example the biological attack on Manhattan, is represented at the head of the tree as Pr(ME). Pr(ME) comprises three causal conditions—Pr(A), Pr(B), and Pr(C)—which are in a conjunctive relation. Pr(A), Pr(B) and Pr(C) each have two causal conditions in a conjunctive relation. Pr(A) comprises the conditions Pr(A1) and Pr(A2). Pr(A1) further comprises Pr(A1a) and Pr(A1b), also in a conjunctive relationship. Pr(A2) comprises Pr(A2a) and Pr(A2b), another conjunctive relationship. Pr(B) comprises Pr(B1) and Pr(B2), of which Pr(B2) comprises Pr(B1a), Pr(B1b) and Pr(B1c), in an exclusive disjunctive relation (XOR). Pr(C) is solely comprised of Pr(C1) and Pr(C2).

FIG. 6 depicts a conditional tree which may be derived through anthropogenic event risk assessment, according to an embodiment of the present invention and provides further detail. The conditional tree 600 further defines the main event expressed above, again with four orders of conditions, also indicates the various types causal relationships and depicts root-level conditions with circles, as opposed to the squares used to depict conditions which require further decomposition.

FIG. 7 shows the conditional tree of FIGS. 5 and 6 with the additional detail of populated probabilities. The conditional tree 700 for the biological attack example again has four orders of conditions, indicates the various types causal relationships, depicts root-level conditions with circles, and populates the root-level conditions with known numeric probabilities. In the biological attack example, each numeric probability was determined to be 50%. Those probabilities are represented here as 0.5 in each of the root level conditions (the circles). The conditional tree 700 may be transformed, as described above, into the probability equation Pr(ME)= Pr(A)·Pr(B)·Pr(C), where:

$$Pr(A)=Pr(A1a)\cdot Pr(A1b))\cdot(Pr(A2a)\cdot Pr(A2b))$$

$$Pr(B)=Pr(B1)\cdot[Pr(B2a)+Pr(B2b)+[Pr(B3a)\cdot(Pr(B3b)+Pr(B3c)]]$$

$$PR(C)=Pr(C1)\cdot PR(C2).$$

As described above, the probability value (at 360 of FIG. 3) is assessed as $Pr(ME)=Pr(A1a) \cdot Pr(A1b) \cdot Pr(A2a) \cdot Pr(A2b) \cdot [Pr(B1) \cdot [Pr(B2a)+Pr(B2b)+[Pr(B3a) \cdot [Pr(B3b)+Pr(B3c)]]] \cdot Pr(C1) \cdot Pr(C2) = 0.5 \cdot 0.5 \cdot 0.5 \cdot 0.5 \cdot [0.5 \cdot [0.5+0.5+[0.5 \cdot [0.5+0.5]]] \cdot 0.5 \cdot 0.5 = 0.011718750 \approx 1\%$.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments, such as risk analysis related to a bomb attack on a stadium or to a kidnapping attempt on a high level official. Thus, the present embodiments should not be limited by any of the above described embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A computer implemented method for determining the risk of an anthropogenic event, comprising:
   a. defining the anthropogenic event and a loss associated with the occurrence of the anthropogenic event;
   b. framing the anthropogenic event as a compound event;
   c. decomposing recursively the compound event into a plurality of causal conditions and causal relationships until lower order causal conditions are represented by a determinable numeric probability;
   d. deriving a probability equation for the anthropogenic event by formulaically representing the plurality of causal conditions and causal relationships identified in the decomposing;
   e. representing the lower order causal conditions of the probability equation with
      i. statistical probabilities; and/or
      ii. estimates of statistical probabilities; and
   f. determining the probability of the anthropogenic event by evaluating the probability equation using the representation of the lower order causal conditions.

2. The computer implemented method of claim 1, determining the risk of the anthropogenic event from the result of the probability determining and the value associated with the occurrence of the anthropogenic event.

3. The computer implemented method of claim 1, further comprising categorizing the plurality of causal relationships of the decomposing as sequential conjunctive, exclusive disjunction, conjunctive or disjunctive, to facilitate the deriving.

4. The computer implemented method of claim 1, further comprising representing the plurality of causal conditions in an event tree diagram.

5. The computer implemented method of claim 1, further comprising repeating the decomposing through iterations sufficient to improve the precision of the probability equation to within a desired error of margin.

6. A computer implemented system for determining the risk of an anthropogenic event, comprising:
   a. an interface configured to receive information about an anthropogenic event, communicating information between a plurality of application components and delivering information to a client;
   b. an inquiry component of the interface configured to collect a compound statement identifying the anthropogenic event, a plurality of causal conditions of the anthropogenic event, a plurality of causal relationships and statistical data corresponding to elements of the plurality of causal conditions;
   c. a formulation component configured to derive a probability equation which formulaically represents the plurality of causal conditions, the plurality of causal relationships and elements collected in the inquiry component;
   d. a probability calculation component configured to determine the probability of the anthropogenic event identified in the compound statement by performing the probability equation of the formulation component using the statistical data collected in the inquiry component; and
   e. a risk calculation component configured to determine the risk of the anthropogenic event identified in the compound statement by multiplying the probability determined in the probability calculation component by a numeric value associated with the occurrence of the anthropogenic event.

7. The computer implemented system of claim 6, further comprising a statistical data component configured to store probability data about the elements of the plurality of causal conditions collected in the inquiry component and deliver the probability data to the inquiry component of the interface.

8. The computer implemented system of claim 6, wherein the inquiry component recurs until the plurality of causal conditions are decomposed into elements having substantially determinable probabilities.

9. The computer implemented system of claim 6, wherein the inquiry component of the interface comprises a graphical event tree.

10. The computer implemented system of claim 6, wherein the probability calculation component further comprises an error margin assessment component for determining an error margin of the probability determined in the probability calculation component and comparing the error margin to a desired error margin.

11. The computer implemented system of claim 10, wherein the interface communicates the result of the error margin assessment component to the formulation component such that the probability equation of the formulation component may be further refined.

12. In a computer implemented system, a memory medium comprising software programmed to determine the risk of an anthropogenic event by a method when executed by a computer, the method comprising:
   a. defining the anthropogenic event and a loss associated with the occurrence of the anthropogenic event;
   b. framing the anthropogenic event as a compound event;
   c. decomposing recursively the compound event into a plurality of causal conditions and causal relationships until lower order causal conditions are represented and causal relationships by a determinable numeric probability;

d. deriving a probability equation for the anthropogenic event by formulaically representing the plurality of causal conditions and causal relationships identified in the decomposing;

e. representing the lower order causal conditions of the probability equation with:
   i. statistical probabilities; and/or
   ii. estimates of statistical probabilities; and f. determining the probability of the anthropogenic event by evaluating the probability equation using the representation of the lower order causal conditions.

13. The memory medium of claim 12, the method further comprising determining the risk of the anthropogenic event from the result of the probability determining and the value associated with the occurrence of the anthropogenic event.

14. The memory medium of claim 12, the method further comprising categorizing the plurality of causal relationships of the decomposing as sequential conjunctive, exclusive disjunctive, conjunctive or disjunctive, to facilitate the deriving.

15. The memory medium of claim 12, the method further comprising representing the plurality of causal conditions in an event tree diagram.

16. The memory medium of claim 12, the method further comprising repeating the decomposing through iterations sufficient to improve the precision of the probability equation to within a desired error of margin.

17. At least one computer configured to execute a software program to determine the risk of an anthropogenic event by a method comprising:

a. defining the anthropogenic event and a loss associated with the occurrence of the anthropogenic event;

b. framing the anthropogenic event as a compound event;

c. decomposing recursively the compound event into a plurality of causal conditions and causal relationships until lower order causal conditions are represented and causal relationships by a determinable numeric probability;

d. deriving a probability equation for the anthropogenic event by formulaically representing the plurality of causal conditions and causal relationships identified in the decomposing;

e. representing the lower order causal conditions of the probability equation with statistical probabilities; and f. determining the probability of the anthropogenic event by evaluating the probability equation using the representation of the lower order causal conditions.

18. The at least one computer of claim 17, the method further comprising determining the risk of the anthropogenic event from the result of the probability determining and the value associated with the occurrence of the anthropogenic event.

19. The at least one computer of claim 17, the method further comprising categorizing the plurality of causal relationships of the decomposing as sequential conjunctive, exclusive disjunction, conjunctive or disjunctive, to facilitate the deriving.

20. The at least one computer of claim 17, the method further comprising representing the plurality of causal conditions in an event tree diagram.

21. The at least one computer of claim 17, the method further comprising repeating the decomposing through iterations sufficient to improve the precision of the probability equation to within a desired error of margin.

* * * * *